Figure 1:
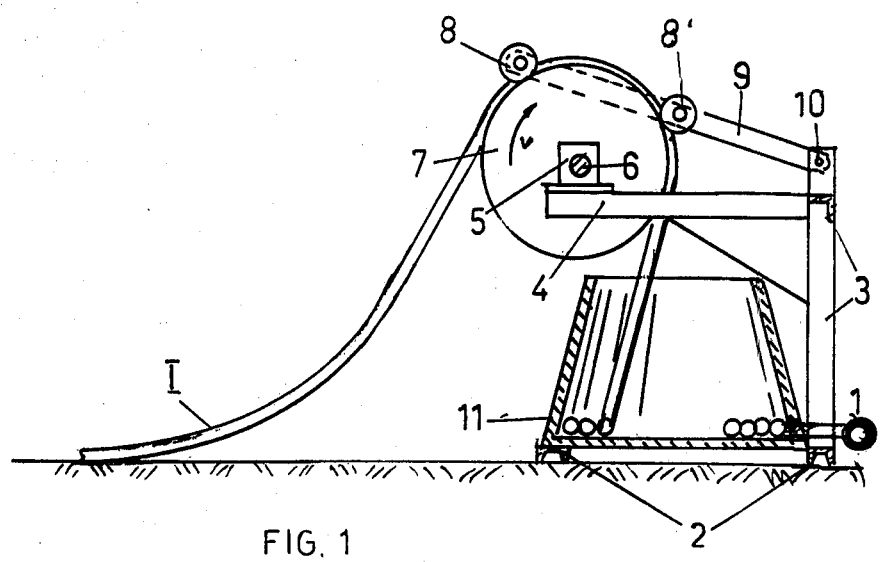

United States Patent [19]

Arzi et al.

[11] 4,283,010

[45] Aug. 11, 1981

[54] METHOD AND APPARATUS FOR IRRIGATION OF FIELDS BY MEANS OF FLEXIBLE HOSES

[75] Inventors: Amatzia Arzi, Doar Na Taanach, Ram'on, Israel; David Chiel, Afulah, Israel

[73] Assignees: Amatzia Arzi, Ram'on; Metal Works Ramat David, Ramat David, both of Israel

[21] Appl. No.: 67,233

[22] Filed: Aug. 16, 1979

[30] Foreign Application Priority Data

Apr. 9, 1979 [IL] Israel ........................................ 57026

[51] Int. Cl.³ ........................ B05B 3/18; B65H 75/34
[52] U.S. Cl. ................................ 239/1; 137/355.17; 137/355.2; 137/355.26; 137/355.28; 239/191; 239/197; 239/198; 239/450
[58] Field of Search .................... 239/1, 191, 195–200, 239/210, 450; 137/344, 355.16, 355.17, 355.2–355.22, 355.26–355.28; 405/36, 51; 47/48.5; 242/86–86.2

[56] References Cited

U.S. PATENT DOCUMENTS

| | | | |
|---|---|---|---|
| 1,355,222 | 10/1920 | French | 405/51 |
| 1,445,616 | 2/1923 | Hotchkiss | 137/355.28 X |
| 2,174,600 | 10/1939 | Schutmaat | 239/212 |
| 3,445,066 | 5/1969 | Mohar | 239/197 X |

FOREIGN PATENT DOCUMENTS 2374842  7/1978  France .................... 239/199

*Primary Examiner*—Andres Kashnikow
*Attorney, Agent, or Firm*—Browdy and Neimark

[57] ABSTRACT

Low-pressure irrigation of fields is carried out simultaneously through a plurality of flexible hoses of equal length, one end of which is connected to a water supply, while the other end is open. The hoses are stretched out in parallel alignment across the field to be irrigated, preferably one hose each between two rows of plants, and all hoses are simultaneously gathered so that their open ends travel over the ground at slow uniform speed while water pours out of the open ends and irrigates the soil. When the open ends of the hoses have reached a point near the water supply, water is turned off and the hoses are transported to another field portion and stretched out in similar fashion. An apparatus for carrying out this irrigation method comprises a slowly rotated shaft which carries grooved pulleys distanced according to the hose distances, one pulley per hose. The hoses are pressed into the pulley grooves by a counterpulley resulting in the hoses being slowly pulled toward the apparatus and being coiled up in containers positioned underneath each of the pulleys. The shaft is rotated by a hydraulic actuator at a speed proportional to the water quantity passing from the supply to the hoses, thus the water quantity issuing from each open hose end remains constant per unit of length traveled. Since there is no obstruction within the hoses and the hose length between supply and outlet remains constant, there is no variation in the flow resistance and the water quantity depends on the supply pressure alone.

8 Claims, 4 Drawing Figures

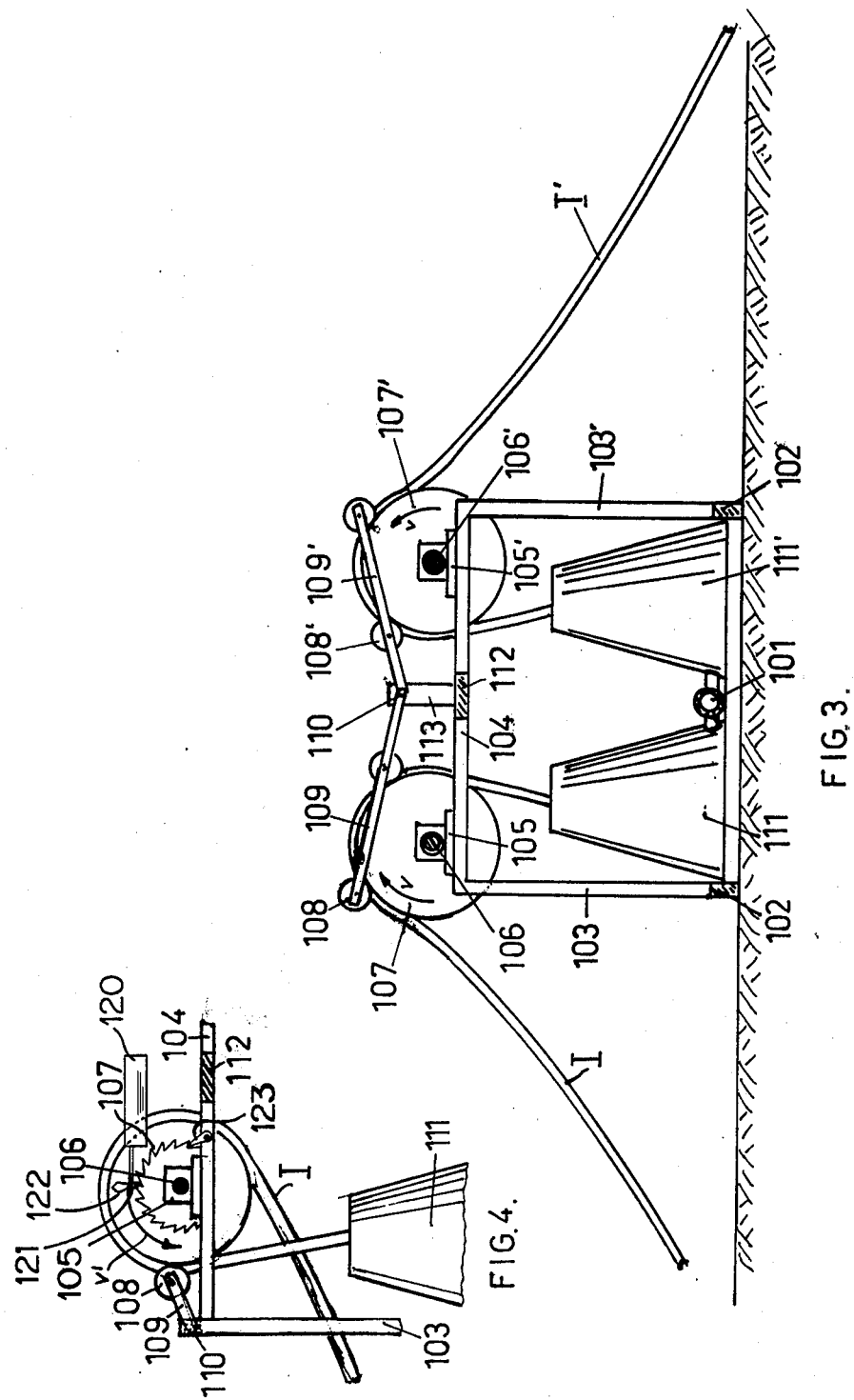

METHOD AND APPARATUS FOR IRRIGATION OF FIELDS BY MEANS OF FLEXIBLE HOSES

The invention relates to the irrigation of fields through a plurality of parallel spaced flexible hoses supplied with water at relatively low pressure.

Simultaneous low-pressure irrigation of larger areas is either carried out by letting water flow along ditches and around beds, or by trickle irrigation. While irrigation through ditches is rather wasteful and irregular, dependent on the slope of the ground, on the correct size of the ditches and the permeability of the soil in every part of the field, trickle irrigation has the inherent drawback of requiring higher water pressure and of the clogging of the nozzles by impurities. In order to reduce clogging to a minimum the water is to be carefully filtered which evidently absorbs pressure head to overcome the filter resistance, in addition to considerable initial investment and high maintenance costs. Another drawback of trickle irrigation is the changing water pressure along long irrigation pipes which results in variable water quantities pouring out of the nozzles according to their distance from the pipe connection to the supply.

With these drawbacks in view, it is the object of the present invention to provide irrigation to relatively large land areas, at relatively low pressures, characterized by even water distribution and by non-clogging of water outlet openings.

The irrigation method, according to the present invention, comprises the following steps:
1. laying and stretching at least one flexible hose in its entire length on a field to be irrigated, preferably between two rows of plants, supplying water under pressure to the rear end of the hose and causing the water to escape through the completely open front end of said hose,
2. pulling said hose and moving said open front end at uniform speed over the ground in rearward direction by means of a mechanical hose-moving device positioned proximate the rear end of the hose, while water is caused to flow through the pipe and out of the open front end,
3. gathering the portion of the hose that has passed through the hose-moving device, in coiled state, and
4. stopping the water supply to the rear end of the hose, as soon as the front end has reached the above hose-moving device.

The device and the hose are not fastened to the ground and therefore movable to a new site to be irrigated, where it is again connected to a low-pressure water supply.

In a preferred embodiment of the invention six to eight parallel hoses are laid out simultaneously and pulled in rearward direction along the ground in uniform motion.

A device for carrying out the operation of pulling one length of hose and coiling it, comprises a grooved main pulley rotated at uniform speed about a horizontal axis by actuator means and at least one grooved counterpulley urged towards the circumference of the main pulley, the grooves in these pulleys corresponding to the diameter of the flexible hose which latter is clamped between the main pulley and the counter-pulley and pulled in rearward direction at uniform speed by the slowly rotating main pulley. The rear portion of the flexible hose emerging between the two pulleys is preferably coiled up in a container in frusto-conical shape which container has a closed bottom of a largest diameter and an open top of a smallest diameter, and which comprises the water connection to the hose rear end.

In a preferrd embodiment of the hose-moving device two counter-pulleys are provided on the circumference of the main pulley at a distance from each other sufficient to guide the hose along a portion of the main pulley circumference. A suitable apparatus for operating six to eight parallel hoses comprises a corresponding number of main pulleys rigidly fastened at regular internals to a common, horizontal shaft, each pulley being provided with at least one counter-pulley; the shaft and the pulleys are preferably mounted on a common longitudinal base constructed in a manner permitting its transport to another site after irrigation of a specific area. The horizontal shaft is rotated at uniform speed by a hydraulic rotary motor or by a linear actuator turning the shaft by means of a pawl-and-ratchet mechanism.

For collection of the rear hose portions it is proposed to mount on the common base a corresponding number of frustum-shaped containers in parallel alignment, one container underneath and slightly to the rear of each pulley.

For irrigating a section of a field an apparatus carrying from 6 to 8 hoses is carried by a tractor, first to a line corresponding to the initial position of the hose front ends. One or more hoses are anchored in this position, and the apparatus is now carried by the tractor across the field, while the hoses are free to slide through the pulleys out of the containers and to rest on the ground in parallel alignment. The apparatus is lowered into its working position, after the pipes have been stretched out to their total length, and is connected to a water supply pipe. After the hose ends have been freed from their anchoring, water is turned on and the pulleys start their rotation gathering the hoses in their respective containers, thus watering the entire length of the field.

Another method of stretching the hoses consists in positioning the apparatus at once in its final position, actuating the pulleys in reverse direction by reversing the actuator operation, and pulling the front ends of the hoses across the field as far as their length permits. After irrigation of the area the apparatus is carried to another position for a repetition of the operation.

Another embodiment of an apparatus for irrigating a large field comprises hoses extending from a central translatable base in opposite direction, to be drawn across neighboring fields by a corresponding number of hose moving devices which are positioned in a back-to-back arrangement. This apparatus may contain from 4 to 8 pairs of hoses and a corresponding number of pulleys mounted on two parallel shafts that are motioned in opposite sense of rotation by one or two, preferably hydraulic, actuators. A distributor pipe runs along the central base which receives water under pressure from a network and is hydraulically connected to each of the hoses on both sides, in a manner ensuring equal supply to each hose. After the hoses have been pulled in by the pulleys, the base can be moved along a track between the two irrigated fields, from an irrigated section to the adjoining section, thus saving its lifting and transporting by an agricultural tractor. The water connection to the distributor pipe is preferably made by by a flexible hose from a water supply source in the vicinity.

Figure 2:
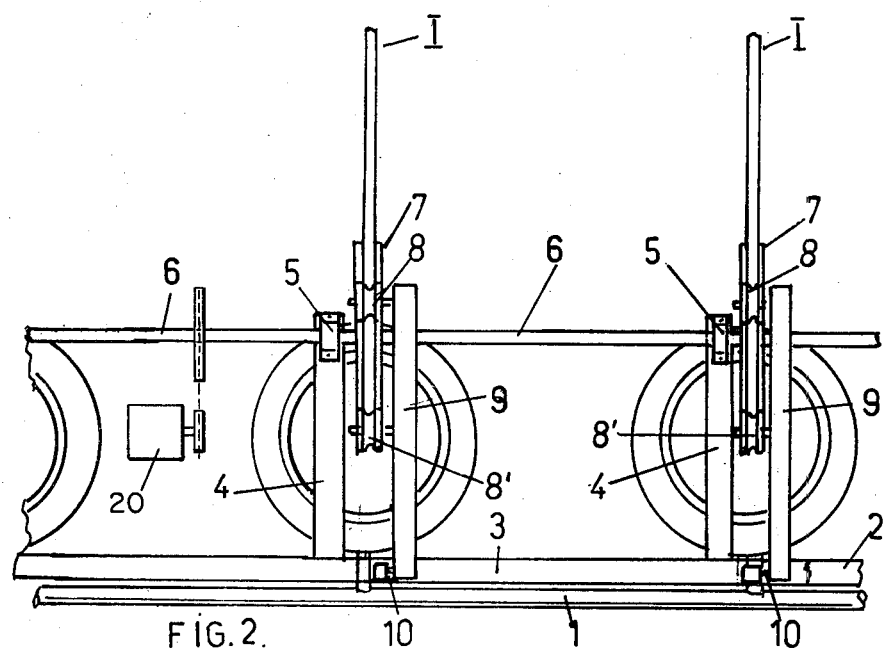

In the accompanying drawings which illustrate, by way of example, two embodiments of the apparatus for carrying the above method into effect, FIG. 1 is a side elevation of such apparatus, FIG. 2 is a plan view of the apparatus of FIG. 1, showing two sets of pulleys and containers for the operation of two flexible hoses, FIG. 3 is a side elevation of an apparatus provided with hose-moving and hose-gathering devices to both sides of a common base, and FIG. 4 illustrates a modification of the hose-moving device of FIG. 3.

The irrigation method according to the present invention will now be explained by referring to the apparatus illustrated in FIGS. 1 and 2 of the drawing. Herein flexible hoses I are stretched on the ground in parallel alignment, preferably between adjoining rows of plants, one apparatus being preferably built to contain 6 to 8 flexible hoses. The rear end of each hose is connected to a distributor pipe 1 extending along the entire length of the apparatus, while the front end is open and laid at the maximum distance from the apparatus. The apparatus comprises a supporting structure consisting of a flat base 2, an upstanding rear frame 3 and a number of bearing supports 4, each provided with a horizontally positioned bearing 5. A horizontal shaft 6 is carried in the bearings 5 which are coaxially aligned, and the shaft is adapted to be driven at constant speed by a suitable prime mover 20, which is preferably a hydraulic, rotary or linear, actuator, but may alternatively, be in the form of an electric gear motor or an internal combustion engine (the prime mover is not visible in the drawing).

The shaft carries at the preselected distances of the hoses I, a corresponding number of large main pulleys 7, each pulley being provided with a circumferential groove of a cross section corresponding to the maximum of one half the circular cross section of the hoses I. Each hose is laid into the groove of the corresponding pulley and held therein by two counterpulleys 8 and 8' which are rotationally fastened in spaced-apart relationship to a boom 9 which is fastened to the frame 3 by means of a horizontal axle 10. The main pulleys 7 are rotated by the shaft 6 in the direction of the arrow v, and the hoses—which are pressed to the main pulleys by each set of counterpulleys—are moved in the same direction, whereby their front ends are slowly dragged across the ground, while water flows out and irrigates the area around the free ends. The portion of each hose which has passed its pulley is collected in a collecting vessel 11—one for each hose—of frusto-conical shape positioned with its vertical axis coinciding with the rear of the main pulley, all collecting vessels being mounted on the base of the supporting structure at distances corresponding to those of the hoses. Each collecting vessel is provided in its bottom or in its side wall with an opening through which the rear end of the hose is made to penetrate for its connection to the distributor pipe 1. The hose peeling off the pulley enters the vessel freely and collects therein in superposed spiral layers, which form there automatically without outside assistance.

The apparatus which contains from 6 to 8 parallel hoses and hose-coiling devices, is sufficiently light to be lifted by an agricultural tractor for transporting it from site to site. It is preferably provided with means for ready attachment of a three-point linkage.

It will be understood that the apparatus is adjustable both in regard to the rotational speed of the shaft as in regard to the water quantity supplied, with the aim to obtain an optimum measure of irrigation. A preferred drive arrangement consists of a linear actuator rotating the shaft unidirectionally by means of a ratchet wheel and two pawls as known to the art.

The advantages of this method, compared with other methods, are that the water quantity per hose does not vary while the hose is coiled up, because the length and the hydraulic resistance remain unchanged. Since no narrow nozzles or other flow-restricting devices are incorporated, the total losses are low and the main pressure need not be higher than with open-ditch irrigation.

In the case of the shaft being rotated by a hydraulic actuator, it is self-evident that the motion is dependent on the amount of water passing through the apparatus; for this reason, should the water supply be stopped or slowed down, the motion of the hoses on the ground will be automatically stopped or slowed down proportionally. This is not possible with electric motors or combustion engines which—for this reason—are not really recommended.

The aforedescribed apparatus represents one embodiment only of a large number of designs possible and should be regarded as such. Another embodiment is shown in FIG. 3 of the drawing illustrating a section through an apparatus which may contain from 4 to 8 sets of hoses I, I' and hose moving devices on each side, whereof only one pair is visible. The apparatus comprises a base consisting of two longitudinal members 102, a plurality of upstanding members 103, 103' and horizontal cross members and bearing supports 104. The cross members are interconnected by a longitudinal beam 112 on which standards 113 are fastened so as to project upwards between each pair of hose-moving devices. The booms 109, 109' each carrying two counterpulleys 108, 108' are pivotally fastened to the top of each standard 113 by means of a horizontal axle 110. The cross members 104 carry bearings 105, 105' which support two longitudinally extending shafts 106, 106' each driven by a hydraulic actuator (not visible in the drawing) whereby the main pulleys 107, 107' rigidly mounted on the two shafts, are rotated in the direction shown by the arrows v. The rotary movement pulls the hoses I, I' across the opposedly situated fields and causes the collected hose lengths to coil up in the frusto-conical containers 111, 111'. When the open hose ends have reached the pulleys, water supply is stopped and the whole base is moved along a track situated between the two fields in a direction perpendicular to the direction of the hoses. The distribution pipe 101 is connected to the outlet of a central water supply by a flexible hose which may be connected to another outlet after translation of the apparatus to a new site. The hoses I, I' are now uncoiled and stretched across the fields in opposite direction to their full extent, and the irrigation process is started in the new area.

FIG. 4 illustrates a modification of the hose-moving device shown in FIG. 3, wherein the designation of its components is identical in both figures. The main difference between the two embodiments lies in the fact that the grooved pulley—as shown in FIG. 4—is rotated in anti-clockwise direction, for the purpose of obtaining a nearly complete encirclement of the pulley 107 by the hose I and, thereby, an improved adhesion of the hose to the pulley preventing any slip. The front portion of the hose I engages with the underside of the main pulley 107, encircles it by an angle of about 300° and is guided into a frustconical container 111 near the outside of the supporting structure (103, 104, 112) A counterpulley 108 is pressed against the rim of the pulley 107 at a small distance before the point at which the hose leaves the groove of the pulley, and is pivoted about a pin 110 by means of a lever 109. A hydraulic linear actuator 120 rotates the horizontal shaft 106 by means of a ratchet wheel 121 and two pawls 122 and 123.

Although the crossing of the hose portions appears, at the first glance, to hinder an orderly guiding of the hose in the groove, experiments have shown that the hoses enter and leave the grooves in the pulleys without a hitch and that the device works very satisfactorily.

We claim:

1. A method of irrigating a field by means of flexible hoses, comprising the following steps:
   laying and stretching at least two hoses in their entire length, in a parallel spaced apart relationship, on a field to be irrigated;
   supplying water under pressure to the rear of said hoses and causing the water to escape through the completely open front ends of said hoses;
   pulling said hoses and moving said open front ends over the ground in rearward direction by means of a transportable mechanical hose-moving device positioned proximate said rear ends of said hoses, at a velocity proportional to the water volume passing through said hoses, while water is caused to flow out of said open front ends;
   gathering the portions of said hoses that have passed through said hose-moving device; and
   stopping the water supply to said rear ends of said hoses as soon as said front ends have reached said hose-moving device.

2. A mechanical hose-moving device for irrigating a field, comprising:
   at least two flexible hoses of equal length;
   a connecting means to a supply of water under pressure;
   means for supplying an equal volume of water to the rear end of each hose; means for pulling said flexible hoses across a field comprising
   a horizontal shaft,
   a hydraulic actuator means for rotating said shaft at a rotational velocity proportional to the water volume passing through said hoses,
   at least two grooved main pulleys firmly fixed to said shaft at a distance from each other corresponding to the required distance between said hoses,
   at least two grooved counter-pulleys, one each urged toward the circumference of one main pulley, the grooves in said main pulleys and said counter-pulleys corresponding to the diameter of said flexible hoses so as to permit one hose each to be clamped between said main pulley and said counter-pulley and to be moved in rearward direction by rotation of said main pulley.

3. The mechanical device of claim 2, comprising one container each for collecting the rear portion of one of said flexible hoses after its emergence between said pulleys, one container each being positioned beneath one of said main pulleys.

4. The mechanical device of claim 3, wherein each of said containers is in the shape of a frusto-conical vessel having a closed bottom of a large diameter and an open top of a smaller diameter and being provided with a water connection to the rear end of said flexible hose.

5. The mechanical device of claim 2, wherein each main pulley is provided with two counter-pulleys urged toward its circumference at a distance from each other sufficient to guide said flexible hose along a portion of said main pulley.

6. The mechanical device of claim 2, wherein the device includes six of said grooved main pulleys, each said main pulley being fixed to said shaft and having a corresponding counter-pulley, six of said flexible hoses, and six of said frusto-conical collecting vessels, and wherein said connecting means comprises a water distributing pipe connected to the rear ends of each of said hoses passing through the lower portions of said collecting vessels.

7. The mechanical device of claim 2, wherein said hydraulic actuator means comprises a hydraulic linear actuator adapted to rotate said horizontal shaft by means of a ratchet wheel and two pawls.

8. The mechanical device of claim 2, wherein said hydraulic actuator means comprises a hydraulic rotary actuator.

* * * * *